US009893850B2

(12) United States Patent
Ouyang et al.

(10) Patent No.: US 9,893,850 B2
(45) Date of Patent: Feb. 13, 2018

(54) ASA ASSISTANCE-BASED INTERFERENCE COORDINATION METHOD IN HETEROGENEOUS TDD RELAY NETWORK

(71) Applicant: SHANGHAI RESEARCH CENTER FOR WIRELESS COMMUNICATIONS, Shanghai (CN)

(72) Inventors: Yuling Ouyang, Shanghai (CN); Honglin Hu, Shanghai (CN); Haitao Li, Shanghai (CN); Kodo Shu, Shanghai (CN)

(73) Assignee: Shanghai Research Center for Wireless Communications, Shanghai (CN)

( * ) Notice: Subject to any disclaimer, the term of this patent is extended or adjusted under 35 U.S.C. 154(b) by 141 days.

(21) Appl. No.: 14/894,947

(22) PCT Filed: Apr. 18, 2014

(86) PCT No.: PCT/CN2014/075649
§ 371 (c)(1),
(2) Date: Nov. 30, 2015

(87) PCT Pub. No.: WO2014/190823
PCT Pub. Date: Dec. 4, 2014

(65) Prior Publication Data
US 2016/0112165 A1    Apr. 21, 2016

(30) Foreign Application Priority Data

May 31, 2013 (CN) .......................... 2013 1 0213462

(51) Int. Cl.
H04L 5/14       (2006.01)
H04W 16/06      (2009.01)
(Continued)

(52) U.S. Cl.
CPC .............. *H04L 5/0032* (2013.01); *H04L 5/14* (2013.01); *H04W 16/06* (2013.01); *H04W 16/14* (2013.01); *H04W 56/001* (2013.01)

(58) Field of Classification Search
CPC ........ H04L 5/0032; H04L 5/14; H04W 16/06; H04W 16/14; H04W 56/001
See application file for complete search history.

(56) References Cited

U.S. PATENT DOCUMENTS

2013/0039171 A1   2/2013 Gaal et al.
2013/0070626 A1*  3/2013 Gaal ..................... H04W 48/16
                                                     370/252

(Continued)

FOREIGN PATENT DOCUMENTS

CN    103081524    5/2013
WO    2014043854   3/2014

*Primary Examiner* — Andrew Lai
*Assistant Examiner* — M Mostazir Rahman
(74) *Attorney, Agent, or Firm* — Kirton McConkie; Evan R. Witt

(57) ABSTRACT

The present invention provides an authorized shared access (ASA) assisted interference coordination method in a heterogeneous time-division duplexing (TDD) relay network. In a TDD relay system architecture, an ASA controller assists a secondary system to perform an interference coordination mechanism by adjusting a time slot structure configuration and synchronization information, and a mobility management entity (MME) obtains a time slot configuration and the synchronization information of a primary system through ASA, and selects, according to relevant information of a relay node inside a management range, an optimal time slot configuration and a working mode for the relay node.

13 Claims, 4 Drawing Sheets

(51) Int. Cl.
*H04L 5/00* (2006.01)
*H04W 56/00* (2009.01)
*H04W 16/14* (2009.01)

(56) References Cited

U.S. PATENT DOCUMENTS

| | | |
|---|---|---|
| 2013/0121272 A1 | 5/2013 | Barbieri et al. |
| 2013/0159345 A1 | 6/2013 | Kahtava |
| 2013/0176934 A1* | 7/2013 | Malladi ............... H04W 56/001 370/315 |
| 2015/0230098 A1 | 8/2015 | Li |

* cited by examiner

ASA ASSISTANCE-BASED INTERFERENCE COORDINATION METHOD IN HETEROGENEOUS TDD RELAY NETWORK

TECHNICAL FIELD

The invention belongs to the technical field of mobile wireless communication, in particular to an ASA (Authorized Shared Access) assistance-based interference coordination method in a heterogeneous TDD (Time Division Duplexing) relay network.

BACKGROUND

In recent years, mobile users are fast increased. In order to meet great demand of the users on wireless wideband service, International Telecommunication Union (ITU) begins next generation of IMT-Advanced or standardization work of the fourth generation mobile communication system. LTF-Advanced standard will be submitted to ITU as a candidate technological standard of the IMT-Advanced system. Along with evolution of LTE (Long Term Evolution) and continuous growth of the mobile wireless communication system, higher data transmission rate and spectrum efficiency are required. Therefore, 3GPP puts forwards a Camer Aggregation (CA) technology in the new LTE-Advanced standard, which is configured to allow operators to acquire larger bandwidth for system and network deployment through aggregation of some small continuous or noncontinuous carrier waves by realizing a high speed transmission CA technology with sufficient spectrum bandwidth (up to 100 Mhz) and provide backward compatibility for prior users. However, extremely limited spectrum resource in the LTE system hardly meets the high speed transmission demand. Hence, adoption of other authorized spectrums as extension of the existing LTE authorized spectrum becomes one of considerable solutions of the LTE system.

An ASA mechanism is an improved spectrum use mechanism based on a cognitive radio technology, can ensure use QoS (Quality of Service) of the mobile authorized user in an authorized frequency band, and provides ASA spectrum service with insufficient spectrum efficiency for secondary ASA users in the case of not interfering existing users.

In prior art, an ASA-assisted TD-LTE (Time Division Long Term Evolution) system structure is as shown in FIG. 1. Known from the figure, in a scene with coexisting of the ASA assistance-based TD-LTE network and a TDD primary user network, a macro base station controls a Macro User Equipment (MUE), and a relay, and a Relay User Equipment (RUE) is connected with the relay and is positioned at the margin of a cell. In a primary user system, a primary user is controlled by a primary base station. A secondary system operator network Operation, Administration and Maintenance (OAM) and the primary base station are both connected with an ASA controller managing an ASA spectrum. The ASA controller is independent from a 3GPP system. The ASA controller only provides spectrum-related information and actual wireless resource is still in charge of the 3GP system. Two usable carrier frequencies are assumed to exist, one is an existing LTE carrier frequency f0 and the other is an ASA carrier frequency f1. The macro base station uses the carrier frequency f0 as a central frequency point of a Primary Cell (Pcell) to provide system information and basic Radin Resource Control (RRC) signaling, so as to provide low speed/high reliability data transmission for User Equipment (UE). Meanwhile, the macro base station aggregates the ASA carrier frequency f1 as a central frequency point of a Secondary Cell (Scell) to provide massive high-speed data transmission. In this scene, due to dynamics of the ASA spectrum, it is required to further research, keep and improve service continuity, QoS, interference coordination, load balance and switching mechanism of the current system.

A protection region is a specific region defined for protecting communication of the primary user. Threshold is a maximal interference threshold allowed by correct signal receiving of the primary user in the protection region. $Threshold_{SINR}$ is a minimal Signal to Interference plus Noise Ratio (SINR) value. As shown in FIG. 2, C is set as a downlink signal of the primary user, I is set as an interference signal, N is set as a noise signal, then SINR of the primary user in the protection region is equal to C-I-N, which should be higher than $Threshold_{SINR}$. According to related parameters such as $Threshold_1$, or $Threshold_{SINR}$, sending power, path loss, position information and the like, OAM (Operation Administration and Maintenance) judges and ensures that the base station or a terminal does no influence communication of the primary user when the ASA frequency point works.

In a scene with coexisting of the ASA assistance-based TDD-LTE network and TDD primary user network, relay node enhancing cell coverage are deployed on the ASA carrier frequency, the RUE connected with the relay node is positioned at the cell margin, and the primary user is positioned at the margin of the protection region. When the primary user requests for use of the ASA carrier frequency, uplink of the RUE generates interference to downlink of the primary user. Similarly, uplink of the primary user generates interference to the downlink of the RUE.

An interference scene is as shown in FIG. 3, the scene is assumed as follows:

N is set as a noise signal, I1 is interference of RUE uplink to the primary user, I2 is interference of primary user uplink to the RUE, I3 is interference of the relay to the primary user, D1 is a downlink signal of a relay access network, D2 is a downlink signal of the primary user, U1 is an uplink signal of the relay access network, and U2 is an uplink signal of the primary user.

When D2−I1−N is smaller than $Threshold_{SINR}$, the access network uplink of the relay (U1) generates interference to the downlink of the primary user (D2);

when D1−I2−N is smaller than $Threshold_{SINR}$, uplink of the primary user (U2) generates interference to the access network downlink (D1) of the relay;

when D2−I3−N is larger than $Threshold_{SINR}$, access network downlink of the relay (D1) will not generate interference to the downlink of the primary user (D2).

Under the ASA assistance-based TD-LTE network structure, the ASA carrier frequency f1 is assumed to have one or more relay nodes. When the primary user positioned at the margin of the TD-LTE cell requests for use of the carrier frequency f1 at a specific region (namely, the protection region), an RUE communication range close to the primary user is partially overlapped with the protection region, so that the RUE will generate interference to the downlink of the primary user. How to timely find and estimate interference is a key critical problem of ensuring QoS of the primary user.

Generally speaking, the most direct method is that the ASA controller informs the OAM Operator of the newest ASA spectrum use region, the OAM Operator informs the MME of reducing coverage of the macro base station at the margin of the protection region. If in the secondary cell using the ASA carrier frequency, UE or relay node exist outside the new coverage, the UE or the relay node need to be switched to the primary cell f0 unconditionally, thus severely affecting the experience and QoS of a user terminal, and causing network performance reduction; in addition, massive signalings are also consumed due to switching of massive nodes. Along with increment of user number and improvement of user requirements, the operators do not want the unconditional large batch switching.

SUMMARY

In view of shortcomings of the prior art, the invention aims to provide an ASA assistance-based interference coordination method in a heterogeneous TDD relay network, which is used for: in a TDD relay system structure, an ASA controller assists a secondary system in interference coordination through regulating time slot structure configuration and synchronous information, a Mobility Management Entity (MME) acquires time slot configuration and synchronous information of the primary system by ASA, and selects optimal time slot configuration and work mode for the relay node according to related information of the relay node in a jurisdiction range to prevent the secondary system from generate interference to the primary user.

In order to achieve the purpose and other related purposes, the invention provides an ASA assistance-based interference coordination method in a heterogeneous TDD relay network, which is used in a scene with coexisting of an ASA assistance-based TD-LTE network and a TDD primary user network, and comprises two usable carrier frequencies, one of which is an LTE carrier frequency f0 and the other of which is an ASA carrier frequency f1, the carrier frequency f1 is a central frequency point of a primary cell and the ASA carrier frequency f1 is a central frequency point of a secondary cell, and the method comprises following steps:

Step 1, when the primary user requests for use of the ASA carrier frequency f1, a primary system sends a request to an ASA controller to request for leaving ASA spectrum users in a protection region;

Step 2, after the ASA controller receives the request from the primary system, the ASA controller sends an ASA control message to the OAM Operator;

Step 3, after the OAM Operator receives the ASA control message, an MME (Mobility Management Entity) being inquired according to a new protection region or an interference region message in the ASA control message, and the ASA control message being sent to the MME to adjust the coverage of a macro base station in a region possibly interfering to the primary system, the region possibly interfering to the primary system belonging to the MME;

Step 4, the MME calculates and informs related macro base stations of adjusting wireless resource control according to a new interference region and sends frame configuration information and synchronous information of the primary system to the related macro base stations.

Step 5, the macro base station adjusts wireless resource control and reduces coverage of the ASA carrier frequency f1 on the secondary cell to avoid the interference generated to a primary system cell; and the macro base station finds an RUE close to the protection region of the primary system and possibly interfering to the primary user, adjusts a frame structure of a relay node to which the RUE belongs and updates synchronous information;

Step 6, the macro base station sends new frame configuration information and synchronous information to the relay node;

Step 7, the macro base station reports a new coverage of subordinate base stations and/or a coverage of the relay node and a work mode; and Step 8, the ASA controller periodically sends frame configuration and synchronous information of the primary system to the OAM Operator.

According to the ASA assistance-based interference coordination method in a heterogeneous TDD relay network, wherein, in step 1, the request message comprises frame configuration information and time synchronous information of the primary system and is stored in an ASA database.

According to the ASA assistance-based interference coordination method in a heterogeneous TDD relay network, wherein, in step 2, the ASA control message comprises the protection region or spectrum use-related information, and frame configuration information and synchronous information of the primary system.

According to the ASA assistance-based interference coordination method in a heterogeneous TDD relay network, wherein, during execution of step 5, it is not required that an LTE secondary system and the primary system are kept precise synchronization, within downlink transmission subframe of the primary user, the relay node can carry out access downlink transmission, backhaul downlink transmission or backhaul uplink transmission; and that within uplink transmission subframe of the primary user, the relay node can carry out access uplink transmission, backhaul downlink transmission or backhaul uplink transmission.

According to the ASA assistance-based interference coordination method in a heterogeneous TDD relay network, wherein, in step 5, if the macro base station can acquire precise position information of the RUE and the relay node, the macro base station directly controls the relay node and subordinate the RUE to adjust frame configuration information, or configures part of the RUE to measure to judge whether interference is generated to the primary user.

According to the ASA assistance-based interference coordination method in a heterogeneous TDD relay network, wherein, in step 5, if the macro base station cannot acquire precise position information of the RUE, the macro base station or the relay node configure all RUE to measure to judge whether interference is generated to the primary user.

According to the ASA assistance-based interference coordination method in a heterogeneous TDD relay network, wherein, in step 5, the frame structure of the relay node to which the RUE belongs is adjusted according to following principles: a downlink access link subframe of a TD-LTE network relay is positioned in a downlink subframe of the primary user and an uplink access link subframe of the relay node is positioned in an uplink subframe of the primary user.

As mentioned above, according to the ASA assistance-based interference coordination method in a heterogeneous TDD relay network, spectrum efficiency is improved, switching times and signaling consumption caused by switching are reduced, integral performance of a TD-LTE cognitive network is effectively improved, and QoS of secondary users is ensured.

DETAILED DESCRIPTION

Embodiments of the invention are described through specific examples, and those skilled in the art can easily learn other advantages and effects of the invention by content disclosed in the description. The invention can also be implemented or applied through other different specific embodiments, respective details in the description can be subject to various modifications or alternations based on different opinions and applications without departing from spirit of the invention.

Figure 1:
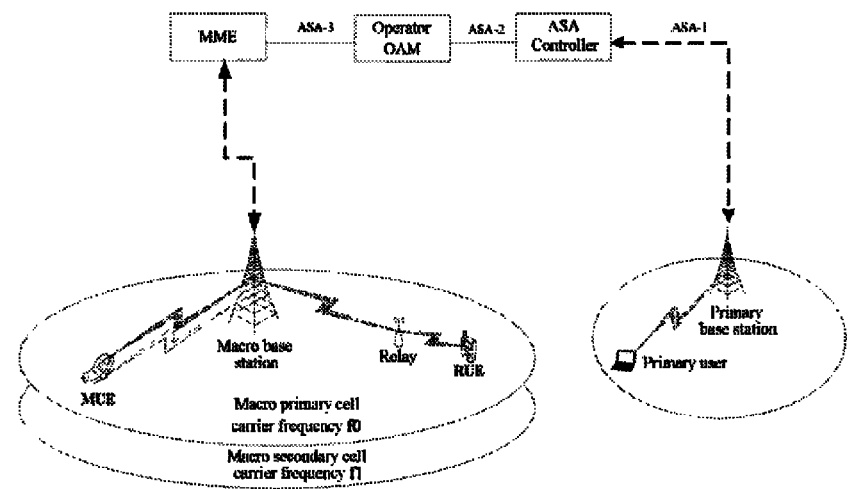
FIG. 1 shows a structural schematic diagram of an ASA assisted TD-LTE system structure in prior art.
Figure 2:
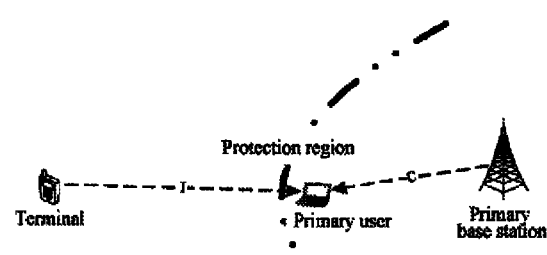
FIG. 2 shows a schematic diagram of a protection region of a primary user system in prior art.
Figure 3:
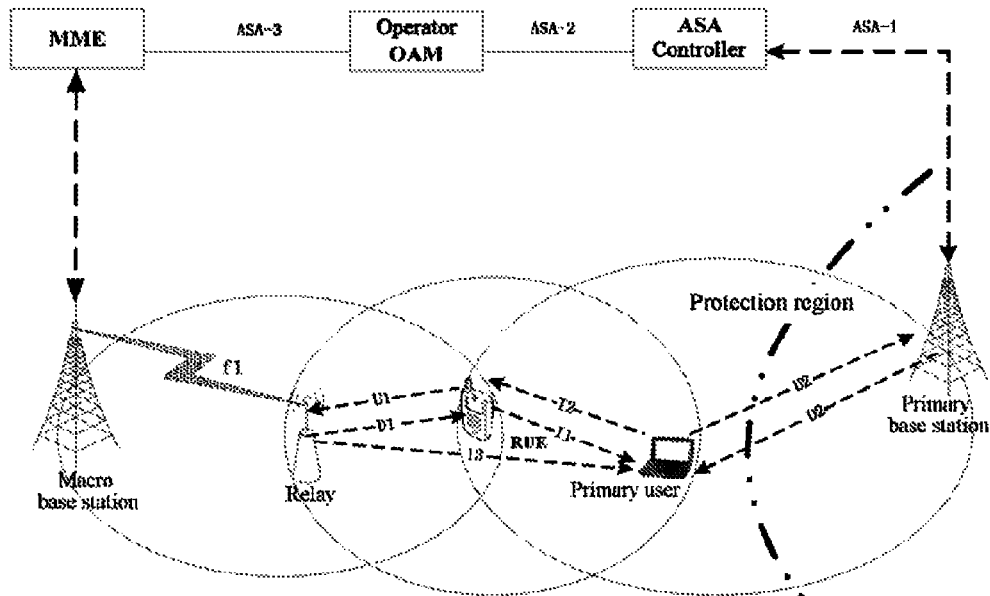
FIG. 3 shows a schematic diagram of an interference scene of an ASA assisted TD-LTE system structure in prior art.
Figure 4:
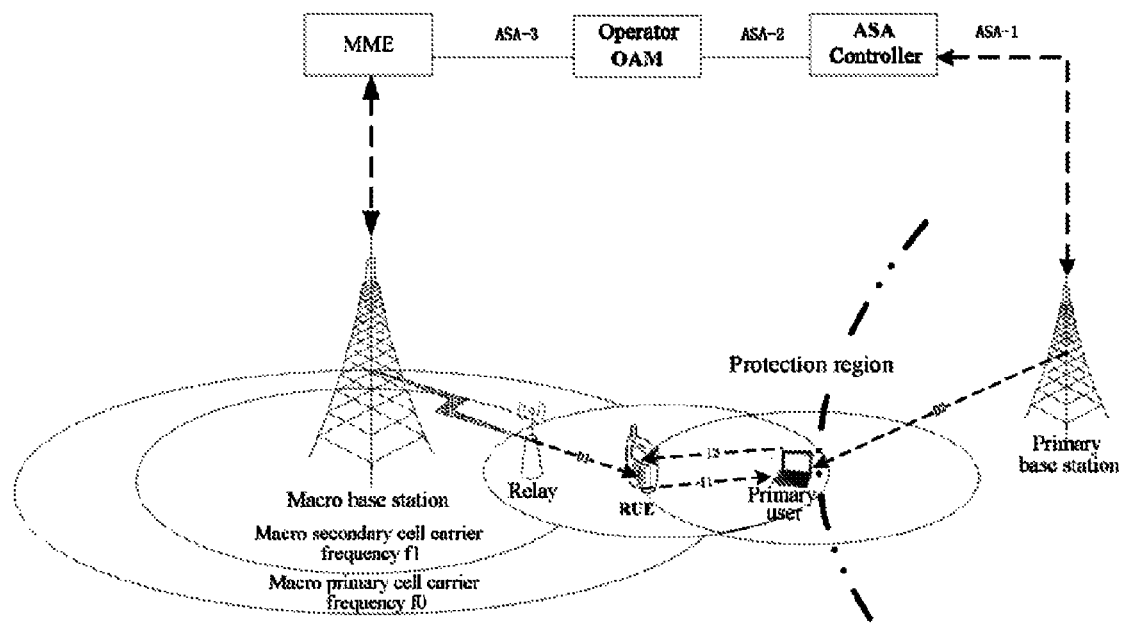
FIG. 4 is a scene schematic diagram of an ASA assistance-based interference coordination system in a heterogeneous TDD relay network of the invention.

Different from an interference coordination method based on a self adaption power control mechanism, the invention adjusts the time slot configuration of the relay node by cooperation of ASA and MME to achieve an aim of interference coordination. FIG. 4 is a scene schematic diagram of an ASA assistance-based interference coordination system in a heterogeneous TDD relay network of the invention. Known from the figure, in a scene with coexisting of an ASA assistance-based TD-LTE network and a TDD primary user network, a macro base station controls a relay node, and an RUE connected with the relay is positioned at a cell margin. In a primary user system, the primary user is controlled by a primary base station and is positioned at the margin of a protection region. A secondary system OAM Operator and the primary base station are both connected with an ASA controller managing ASA spectrum. The ASA controller is independent from a 3GPP system. The ASA controller only provides spectrum-related information and actual wireless resource is still in charge of the 3GPP system. Two usable carrier frequencies are assumed to exist, one is an existing LTE carrier frequency f0 and the other is an ASA carrier frequency f1. The macro base station uses the carrier frequency f0 as a central frequency point of a Pcell to provide system information and basic RRC signaling, so as to provide speed/high reliability data transmission for User Equipment (UE) as much as possible. Meanwhile, the macro base station aggregates the ASA carrier frequency f1 as a central frequency point of a Scell to provide massive high-speed data transmission. In this scene, when the primary user requests for use of the ASA carrier frequency, uplink of the RUE generates interference to downlink of the primary user. Similarly, uplink of the primary user generates interference to the downlink of the RUE.

Figure 5:
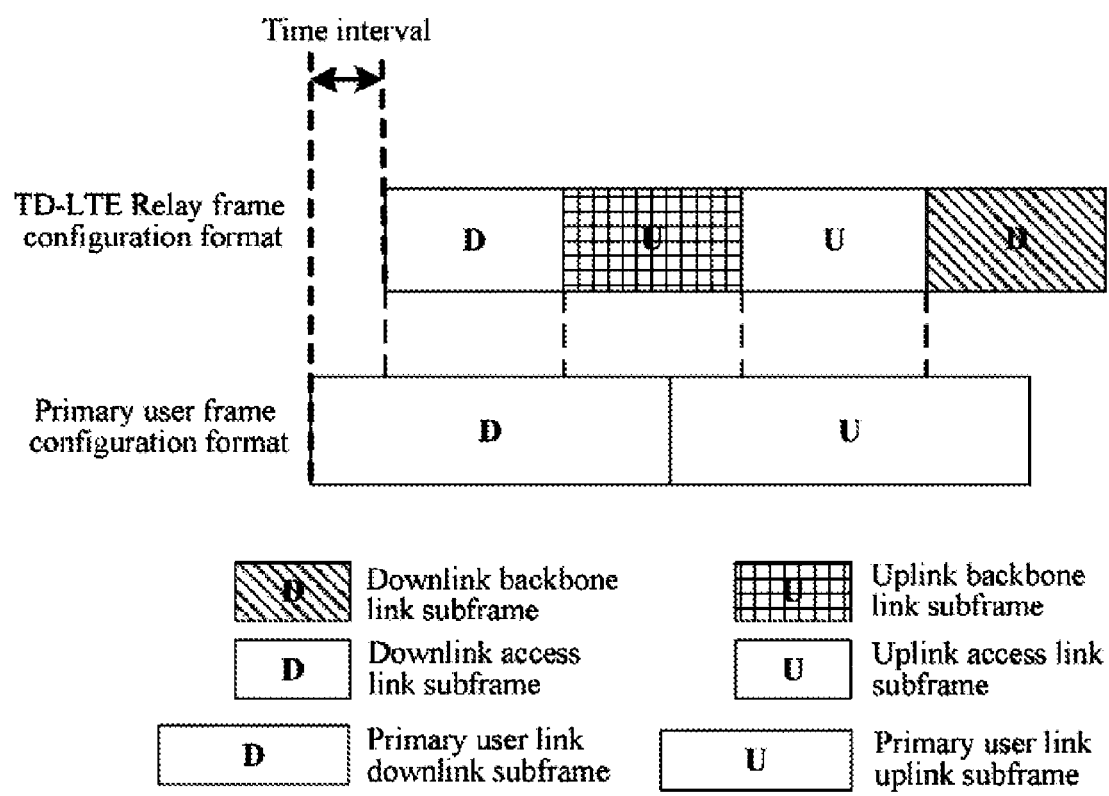
FIG. 5 shows a reference diagram of ASA assisted dual system frame configuration in the invention.
Figure 6:
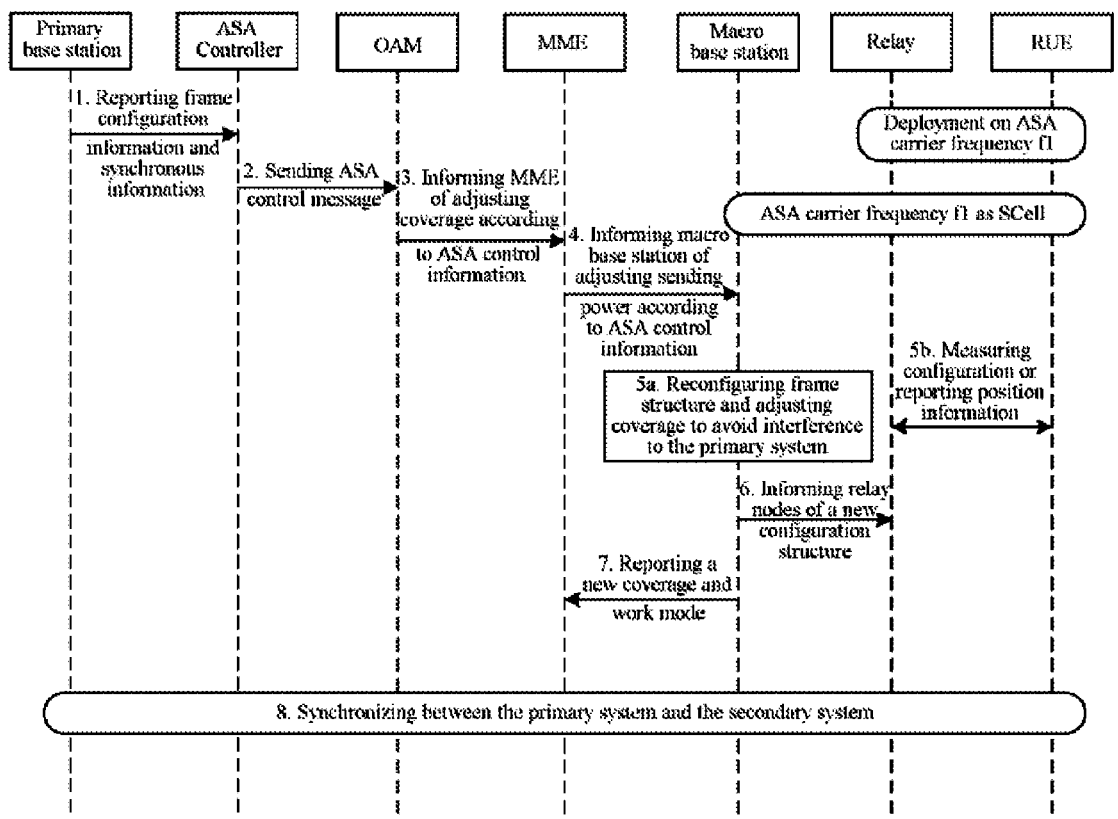
FIG. 6 shows a flowchart of an ASA assisted relay interference coordination signaling in the invention.

With reference to FIG. 6, the ASA assistance-based interference coordination method in a heterogeneous TDD relay network comprises following steps:

Step 1, when the primary user requests for use of the carrier frequency f1, a primary system (the primary base station) sends a request to an ASA controller to request for leaving ASA spectrum users in a protection region, the request comprises frame configuration information and time synchronous information of the primary system and is stored in an ASA database;

Step 2, after the ASA controller receives the request from the primary system, the ASA controller sends an ASA control message to the OAM Operator, the control message comprises the protection region or spectrum use-related information, and frame configuration information and synchronous information of the primary system, if required, the OAM Operator further updates coverage and a work mode of a secondary system macro base station according to this message;

Step 3, after the OAM Operator receives the ASA control message, an MME (Mobility Management Entity) is inquired according to a new protection region or an interference region message in the ASA control message, and the ASA control message is sent to the MME to adjust the coverage of a macro base station in a region possibly interfering to the primary system, the region possibly interfering to the primary system belonging to the MME;

Step 4, the MME calculates and informs related macro base stations of adjusting wireless resource control (sending power, wave beam direction and the like) according to a new interference region, and sends frame configuration information and synchronous information of the primary system to the related macro base stations Step 5, the macro base station adjusts wireless resource control (sending power, wave beam direction and the like) and reduces coverage of the secondary cell on the ASA carrier frequency f1 to avoid the interference generated to a primary system cell (a cell to which the primary system belongs); if the RUE exists near to the protection region of the primary system, the macro base station combines a current network state (sending power, user capacity, business flow, time delay need and the like of the relay and RUE) and the ASA control message (frame configuration and synchronous information of the primary system) to adjust a frame structure of a relay node to which the RUE belongs, and update synchronous information, and RUE uplink is prevented from interfering to the primary user downlink. This mechanism does not require the precise synchronization between the LTE secondary system and the primary system, during transmitting a downlink transmission subframe of the primary user, the relay node can carry out downlink transmission of an access link, downlink transmission of a backhaul link or uplink transmission of the backhaul link; and during transmitting an uplink transmission subframe of the primary user, the relay node can carry out uplink transmission of an access link, downlink transmission of the backhaul link or uplink transmission of the backhaul link. An application example of a frame configuration method of the TD-LTE network and the primary user network is as shown in FIG. 5, when the TD-LTE secondary network generates interference to the primary system or primary user, configuration of a TD-LTE frame structure is required to ensure that a downlink access link subframe of a TD-LTE network relay is positioned in a downlink subframe of the primary user and uplink access link subframe of the relay node is positioned in an uplink subframe of the primary users, and a relay backhaul link can be flexibly configured.

In other words, the downlink transmission subframe of the primary user begins earlier than the access downlink transmission; and the downlink transmission subframe of the primary user ends within the backhaul uplink transmission, the downlink transmission subframe of the primary user begins earlier than the access downlink transmission; and the downlink transmission subframe of the primary user ends within the backhaul uplink transmission.

Wherein, the macro base station can find the RUE close to the protection region of the primary system and possibly interfering to the primary user by adopting following steps:

if the macro base station can acquire precise position information (for example, GPS positioning information) of the RUE and the relay node, the macro base station directly controls the relay node and subordinate the RUE to adjust frame configuration information, or configures part of the RUE to measure to judge whether interference is generated to the primary user.

If the macro base station cannot acquire precise position information of the RUE, the macro base station or the relay node configure all RUE to measure. Based on a measuring report, the macro base station reconfigures a frame structure and frame starting time for related relay node and subordinate RUE to enable the relay node to continuously use the ASA carrier frequency f1.

Step 6, the macro base station sends new frame configuration information and synchronous information to the relay node;

Step 7, the macro base station reports new coverage of subordinate macro base stations and/or coverage of the relay node and a work mode (time slot coordination or non-time slot coordination mode, frame configuration information and the like). Such reported information can assist MME in monitoring and managing allocation of the ASA spectrum.

Step 8, the ASA controller periodically sends frame configuration and synchronous information of the primary system to the OAM Operator.

In conclusion, according to the ASA assistance-based interference coordination method in a heterogeneous TDD relay network, under a TDD relay system structure, the ASA controller assists a secondary system for an interference coordination mechanism by regulating time slot structure configuration and synchronous information, the MME acquires time slot configuration and synchronous information of the primary system by the ASA, and selects optimal time slot configuration and work mode for the relay node according to related information of the relay node in a jurisdiction range to prevent the secondary system from generate interference to the primary user, spectrum efficiency is improved, meanwhile, a relay node continuously work on the ASA carrier frequency f1, thus avoiding signaling consumption caused by a relay node and massive RUE switching and network performance reduction, Therefore, the invention effectively overcomes various defects in the prior art and has high industrial value in use.

The embodiments only exemplarily describe principles and effects of the invention and do not intend to limit the invention. Any skilled in the art can modify or alter the embodiments without disobeying spirit and scope of the invention. Therefore, all equivalent modifications or alternations finished by a person with common knowledge in the art without departing from spirit and technological through disclosed by the invention are still covered by claims of the invention.

What is claimed is:

1. An ASA (Authorized Shared Access) assistance-based interference coordination method in a heterogeneous TDD (Time Division Duplexing) relay network, which is used in a scenario with coexisting of an ASA assistance-based TD-LTE (Time Division Long Term Evolution) network and a TDD primary user network, the heterogeneous TDD relay network comprising two usable carrier frequencies, one of which is an LTE (Long Term Evolution) carrier frequency f0 and the other of which is an ASA carrier frequency f1, the LTE carrier frequency f0 is a central frequency point of a primary cell and the ASA carrier frequency f1 is a central frequency point of a secondary cell, wherein, the method comprises following steps:

Step 1, a primary system sending a request to an ASA controller to request for leaving ASA spectrum users in a protection region, when a primary user requests for use of the ASA carrier frequency f1;

Step 2, the ASA controller sending an ASA control message to an OAM (Operation, Administration and Management) Operator after the ASA controller receives the request from the primary system;

Step 3, after the OAM Operator receives the ASA control message, an MME (Mobility Management Entity) being inquired according to a new protection region or an interference region message in the ASA control message, and the ASA control message being sent to the MME to adjust the coverage of a macro base station in a region possibly interfering to the primary system, the region possibly interfering to the primary system belonging to the MME;

Step 4, the MME calculating and informing related macro base stations to adjust wireless resource control according to a new interference region, and sending frame configuration information and synchronous information of the primary system to the related macro base stations;

Step 5, the macro base station adjusting the wireless resource control and reducing coverage of the secondary cell on the ASA carrier frequency f1 to avoid interference to a cell to which the primary system belongs; and the macro base station finding an RUE (Relay User Equipment) close to the protection region of the primary system and possibly interfering to the primary users, adjusting a frame structure of a relay node to which the RUE belongs, and updating synchronous information;

Step 6, the macro base station sending new frame configuration information and synchronous information to the relay node;

Step 7, the macro base station reporting new coverage of subordinate base stations and/or coverage of the relay node and a work mode; and Step 8, the ASA controller periodically sending frame configuration and the synchronous information of the primary system to the OAM Operator.

2. The ASA assistance-based interference coordination method in the heterogeneous TDD relay network of claim 1, wherein, in step 1, the request message comprises frame configuration information and time synchronous information of the primary system and is stored in an ASA database.

3. The ASA assistance-based interference coordination method in the heterogeneous TDD relay network of claim 1, wherein, in step 2, the ASA control message comprises the protection region or spectrum use-related information, and frame configuration information and synchronous information of the primary system.

4. The ASA assistance-based interference coordination method in the heterogeneous TDD relay network of claim 1, wherein, during execution of step 5, within downlink transmission subframe of the primary user, the relay node can carry out access downlink transmission, backhaul downlink transmission and/or backhaul uplink transmission; and within uplink transmission subframe of the primary user, the relay node can carry out access uplink transmission, backhaul downlink transmission and/or backhaul uplink transmission.

5. The ASA assistance-based interference coordination method in the heterogeneous TDD relay network of claim 1, wherein,
   in step 5, if the macro base station can acquire precise position information of the RUE and the relay node, the macro base station directly controls the relay node and subordinate RUE to adjust frame configuration information, or configures part of RUE to measure to judge whether interference is generated to the primary user.

6. The ASA assistance-based interference coordination method in the heterogeneous TDD relay network of claim 1, wherein,
   in step 5, if the macro base station cannot acquire precise position information of the RUE, the macro base station or the relay node configure all RUE to measure to judge whether interference is generated to the primary user.

7. The ASA assistance-based interference coordination method in the heterogeneous TDD relay network of claim 1, wherein,
   in step 5, the frame structure of the relay node to which the RUE belongs is adjusted according to following principles: a downlink access link subframe of a TD-LTE network relay is positioned in a downlink subframe of the primary user and an uplink access link subframe of the relay node is positioned in an uplink subframe of the primary user.

8. The ASA assistance-based interference coordination method in the heterogeneous TDD relay network of claim 1, wherein the heterogeneous TDD relay network comprises: the ASA assistance-based TD-LTE network with the relay node, and the TDD primary user network with the primary user, wherein when the relay node interferes the primary user, the relay node adjusts its frame configuration so that, within transmitting a downlink transmission subframe of the primary user, the relay node can carry out access downlink transmission, backhaul downlink transmission and/or backhaul uplink transmission; and that within transmitting an uplink transmission subframe of the primary user, the relay node can carry out access uplink transmission, backhaul downlink transmission and/or backhaul uplink transmission.

9. The ASA assistance-based interference coordination method of claim 8, wherein,
   when the relay node interferes the primary user, the relay node adjusts its frame's synchronous information so that its frame begins in advance comparing to a frame of the primary user.

10. The ASA assistance-based interference coordination method of claim 8, wherein,
    the relay node periodically receives frame configuration information and synchronous information of the primary user;
    when the relay node interferes the primary user, the relay node adjusts its frame's synchronous information and frame configuration.

11. The ASA assistance-based interference coordination method of claim 8, wherein,
    the downlink transmission subframe of the primary user begins earlier than the access downlink transmission; and
    the downlink transmission subframe of the primary user ends within the backhaul uplink transmission.

12. The ASA assistance-based interference coordination method of claim 8, wherein,
    the uplink transmission subframe of the primary user begins earlier than the access uplink transmission; and
    the uplink transmission subframe of the primary user ends later than the backhaul uplink transmission.

13. A relay node applying the ASA assistance-based interference coordination method of claim 1.

* * * * *